United States Patent
Stoica et al.

(10) Patent No.: US 8,566,436 B1
(45) Date of Patent: Oct. 22, 2013

(54) DATA CLIENT

(75) Inventors: Ion Stoica, Piedmont, CA (US); Hui Zhang, Pittsburgh, PA (US); Steven R. Mccanne, Berkeley, CA (US); Jibin Zhan, Pittsburgh, PA (US); Aditya R. Ganjam, Mountain View, CA (US)

(73) Assignee: Conviva Inc., San Mateo, CA (US)

( * ) Notice: Subject to any disclaimer, the term of this patent is extended or adjusted under 35 U.S.C. 154(b) by 748 days.

(21) Appl. No.: 12/730,032

(22) Filed: Mar. 23, 2010

Related U.S. Application Data

(63) Continuation-in-part of application No. 11/897,953, filed on Aug. 30, 2007, now Pat. No. 8,458,333.

(60) Provisional application No. 60/859,428, filed on Nov. 15, 2006, provisional application No. 61/210,928, filed on Mar. 23, 2009.

(51) Int. Cl.
*G06F 15/173* (2006.01)

(52) U.S. Cl.
USPC ............................ 709/223; 709/203; 370/329

(58) Field of Classification Search
USPC ............................ 709/203, 223, 202; 370/329
See application file for complete search history.

(56) References Cited

U.S. PATENT DOCUMENTS

| | | | |
|---|---|---|---|
| 6,906,743 B1 | 6/2005 | Maurer | |
| 7,006,666 B2 | 2/2006 | Montgomery | |
| 7,010,598 B2 | 3/2006 | Sitaraman et al. | |
| 7,313,087 B2 | 12/2007 | Patil et al. | |
| 7,389,537 B1 | 6/2008 | Callon et al. | |
| 7,487,509 B2* | 2/2009 | Hugly et al. | 719/310 |
| 7,509,372 B2 | 3/2009 | Dutta et al. | |
| 7,593,333 B2 | 9/2009 | Li et al. | |
| 7,620,848 B1 | 11/2009 | Tanner | |
| 7,668,914 B2 | 2/2010 | Parker et al. | |
| 7,698,460 B2 | 4/2010 | Zhang et al. | |
| 7,725,576 B2 | 5/2010 | Sitaraman et al. | |
| 7,844,491 B1 | 11/2010 | Haitsuka et al. | |
| 7,873,727 B2 | 1/2011 | Pal et al. | |
| 7,921,215 B2 | 4/2011 | Dessart | |
| 7,921,222 B2 | 4/2011 | Courtemanche | |
| 7,930,347 B2 | 4/2011 | Maxwell et al. | |
| 7,970,402 B2 | 6/2011 | Wu et al. | |
| 8,259,597 B1 | 9/2012 | Oak | |
| 2002/0002708 A1 | 1/2002 | Arye | |
| 2002/0082730 A1 | 6/2002 | Capps et al. | |
| 2002/0184357 A1* | 12/2002 | Traversat et al. | 709/223 |
| 2003/0046383 A1 | 3/2003 | Lee et al. | |
| 2003/0051051 A1 | 3/2003 | O'Neal et al. | |
| 2003/0061305 A1 | 3/2003 | Copley et al. | |

(Continued)

OTHER PUBLICATIONS

Androutsellis et al., A Survey of Peer-to-Peer Content Distribution Technologies, ACM Computing Surveys, vol. 36, No. 4, Dec. 2004, pp. 335-371.

(Continued)

*Primary Examiner* — Frantz Jean
(74) *Attorney, Agent, or Firm* — Van Pelt, Yi & James LLP

(57) ABSTRACT

Facilitating the distribution of content is disclosed. A request for content is received from a requesting peer. A peer type compatibility criteria is applied to an allocation process that allocates at least one sending peer to deliver the content to the requesting peer. The peer type compatibility criteria ensures that a lightweight peer is paired with a regular peer.

16 Claims, 6 Drawing Sheets

(56) References Cited

U.S. PATENT DOCUMENTS

| | | |
|---|---|---|
| 2003/0065763 A1 | 4/2003 | Swildens et al. |
| 2004/0088347 A1* | 5/2004 | Yeager et al. ............... 709/202 |
| 2005/0076104 A1 | 4/2005 | Liskov et al. |
| 2005/0251835 A1 | 11/2005 | Scott et al. |
| 2006/0136218 A1 | 6/2006 | Lee |
| 2006/0179154 A1 | 8/2006 | Sitaraman et al. |
| 2006/0190615 A1 | 8/2006 | Panwar et al. |
| 2007/0066403 A1 | 3/2007 | Conkwright |
| 2007/0101202 A1 | 5/2007 | Garbow |
| 2007/0150612 A1 | 6/2007 | Chaney et al. |
| 2008/0046777 A1 | 2/2008 | Chen et al. |
| 2008/0104454 A1 | 5/2008 | White |
| 2008/0141131 A1 | 6/2008 | Cerny et al. |
| 2008/0144513 A1 | 6/2008 | Small et al. |
| 2008/0155586 A1 | 6/2008 | Yang et al. |
| 2008/0209499 A1 | 8/2008 | Ramesh et al. |
| 2008/0235746 A1 | 9/2008 | Peters et al. |
| 2008/0313040 A1 | 12/2008 | Rose et al. |
| 2009/0010155 A1 | 1/2009 | Liu |
| 2009/0019503 A1 | 1/2009 | Vorbau |
| 2009/0043906 A1 | 2/2009 | Hurst et al. |
| 2009/0083631 A1 | 3/2009 | Sidi et al. |
| 2009/0119722 A1 | 5/2009 | VerSteeg et al. |
| 2009/0125625 A1 | 5/2009 | Shim et al. |
| 2009/0150487 A1 | 6/2009 | Wolfish et al. |
| 2009/0172200 A1 | 7/2009 | Morrison et al. |
| 2009/0187956 A1 | 7/2009 | Sommer |
| 2009/0192929 A1 | 7/2009 | Hoeflinger et al. |
| 2009/0234940 A1 | 9/2009 | Pal et al. |
| 2009/0328124 A1 | 12/2009 | Khouzam et al. |
| 2010/0100635 A1 | 4/2010 | Takemura et al. |
| 2010/0131642 A1 | 5/2010 | Chalikouras et al. |
| 2010/0235503 A1 | 9/2010 | Sitaraman et al. |
| 2011/0014972 A1 | 1/2011 | Herrmann et al. |
| 2011/0060649 A1 | 3/2011 | Dunk et al. |
| 2011/0179435 A1 | 7/2011 | Cordray et al. |
| 2011/0258049 A1 | 10/2011 | Ramer et al. |
| 2012/0093098 A1* | 4/2012 | Charbit et al. ............... 370/329 |

OTHER PUBLICATIONS

Wade Roush, TR10: Peering into Video's Future, Mar. 12, 2007.

Theotokis et al., A Survey of Peer-to-Peer Content Distribution Technologies, ACM Computing Surveys, vol. 36, No. 4, Dec. 2004, pp. 335-371.

* cited by examiner

DATA CLIENT

CROSS REFERENCE TO OTHER APPLICATIONS

This application is a continuation in part of co-pending U.S. patent application Ser. No. 11/897,953 entitled CENTRALLY COORDINATED PEER ASSIGNMENT filed Aug. 30, 2007, which claims priority to U.S. Provisional Patent Application No. 60/859,428 entitled CONTENT DISTRIBUTION filed Nov. 15, 2006, both of which are incorporated herein by reference for all purposes. This application also claims priority to U.S. Provisional Patent Application No. 61/210,928 entitled SEAMLESS SWITCHING FOR STREAMING CONTENT filed Mar. 23, 2009, which is also incorporated herein by reference for all purposes.

BACKGROUND OF THE INVENTION

In various computing environments, such as enterprise environments or small and medium business environments, users of client computers are restricted in some of the actions that they can take with respect to the client computers. As one example, users may be prohibited from installing software applications for security or other policy reasons. Individuals may similarly be prevented from installing software applications on their personal computers by antivirus software, or parental restrictions, or other rules. Unfortunately, such restrictions on the installation of software can significantly hamper the ability of third parties to provide services to users.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
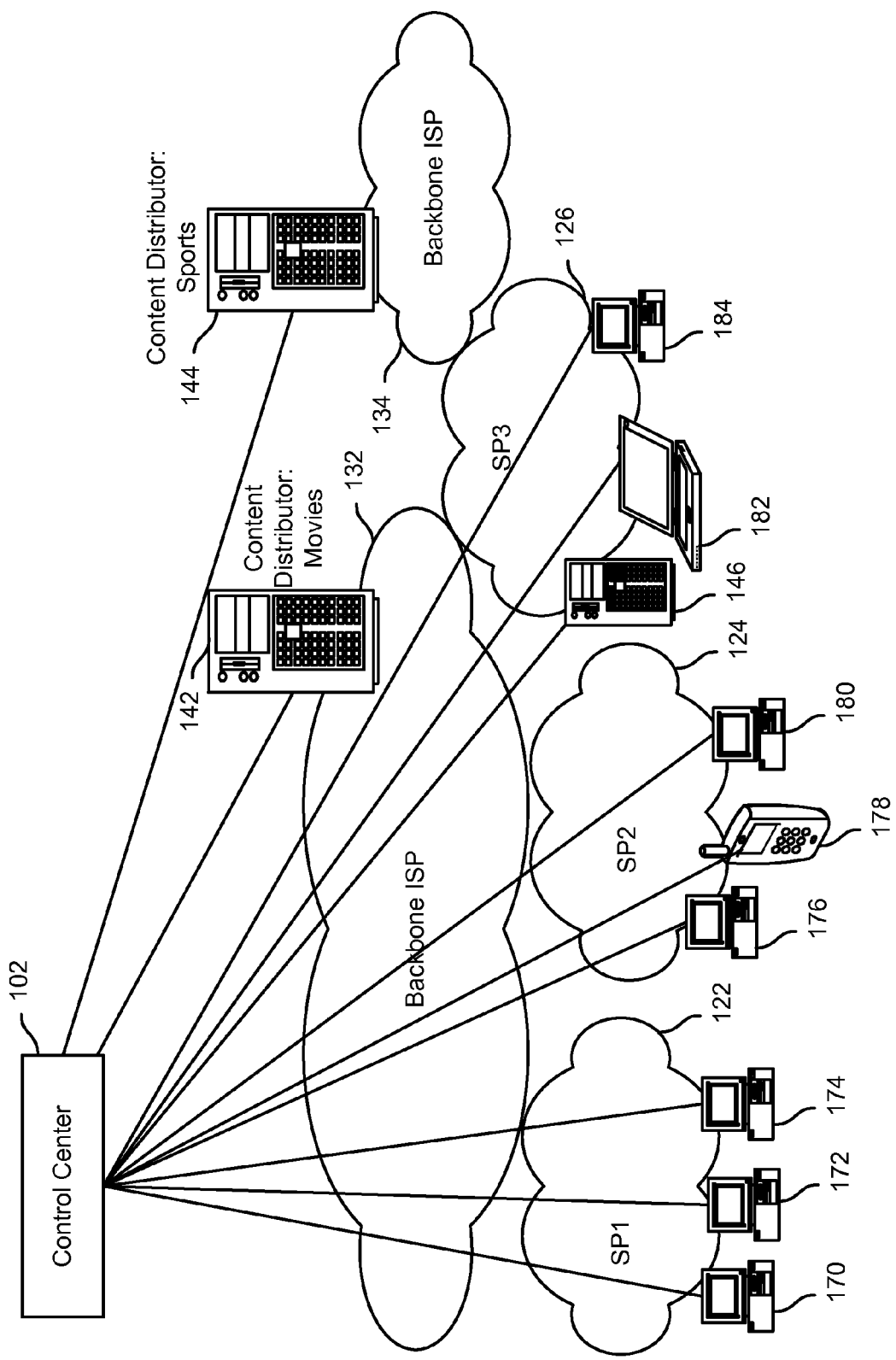
FIG. 1 is an illustration of an embodiment of a system for distributing information over a network.

FIG. 1 is an illustration of an embodiment of a system for distributing information over a network. In the example shown, clients 170-184 are used to access content, such as audiovisual content (e.g., movies, songs, television shows, sporting events, games, etc.) that is owned by content owners. Clients can include personal computers (e.g., 170), laptops (182), and cellular phones/personal digital assistants (178), as well as other types of information appliances (not shown) such as set-top boxes, game consoles, broadband routers, file servers, video servers, and digital video recorders, as applicable. As used herein, nodes can include clients and servers, all of which can be peers—such as parents (serving as source nodes to a destination node), and children (destination nodes that receive information from source nodes) of one another.

The clients shown are used by subscribers to various Internet service providers (ISPs). For example, clients 170, 172, and 174 are subscribed to SP1 (122), while clients 176, 178, and 180 are subscribed to SP2 (124), and clients 182 and 184 are subscribed to SP3 (126).

One typical goal of content owners is for their content to reach their customers (who likely subscribe to different networks) in an efficient, economic manner. In the example shown, a movie studio has contracted with content distributor 142 to provide downloadable copies of its films. Similarly, a soccer league has contracted with content distributor 144 to provide season pass holders with access to live streams of matches. In some cases, the content distributor is owned/operated by the content owner.

Content distributor 142 has a data center that is provided with network access by backbone ISP 132. Though represented here by a single node (also referred to herein as a "CDN node"), content distributor 142 may typically have multiple data centers (not shown) and may make use of multiple backbone or other ISPs. Content distributor 144 has a data center that is provided with network access by backbone ISP 134.

Control center 102 gathers status information from nodes and dynamically constructs and adjusts distribution topologies (made up of "assignments") among nodes. As described in more detail below, in some embodiments nodes provide lightweight heartbeats to control center 102 with information about their resource availability, their performance experience when downloading from or streaming to other clients, etc. The distribution topology constructed by control center 102 also takes into consideration the network traffic implications of the peers it associates. It can provide quality of service, cause resources to be used efficiently, converge quickly in the presence of network changes, and satisfy network-wide constraints and other policies. The control center sends commands back to the nodes instructing them where to obtain content, and in some embodiments also indicates which protocols they should use.

Suppose a user of client 170 desires to watch a soccer match live (as the game occurs) and to simultaneously download a movie for watching after the match ends. Control center 102 might optimize delivery of the live event over the delivery of the movie—selecting peers accordingly.

In various embodiments, nodes run software that monitors resource availability and network congestion and implements data replication and forwarding. Additional visibility into network conditions may also be obtained from sources such as network monitoring tools. The control center may consider a variety and/or combination of factors such as network conditions and resource availability, which files are being distributed, the number of clients, the nature of the content (e.g., live event vs. file; free content vs. premium or ad supported content), and the nature of the client (e.g., whether the user has paid for premium service). As described in more detail below, the control center can also coordinate multiple file transfers to different nodes (e.g., where a user of client 176 wants to download the movie, a user of client 178 wants the sporting feed, and a user of client 180 wants both).

In the example shown, a single control center 102 is used. Portions of control center 102 may be provided by and/or replicated across various other modules or infrastructure depending, for example, on factors such as scalability and availability (reducing the likelihood of having a single point of failure), and the techniques described herein may be adapted accordingly. In some embodiments control center 102 is implemented across a set of machines distributed among several data centers. As described in more detail below, in some embodiments control center 102 uses a Resilience Service Layer (RSL) which ensures that the control center service is not disrupted when/if a subset of control machines fail or a subset of data centers hosting the control center are disconnected from the Internet.

Figure 2:
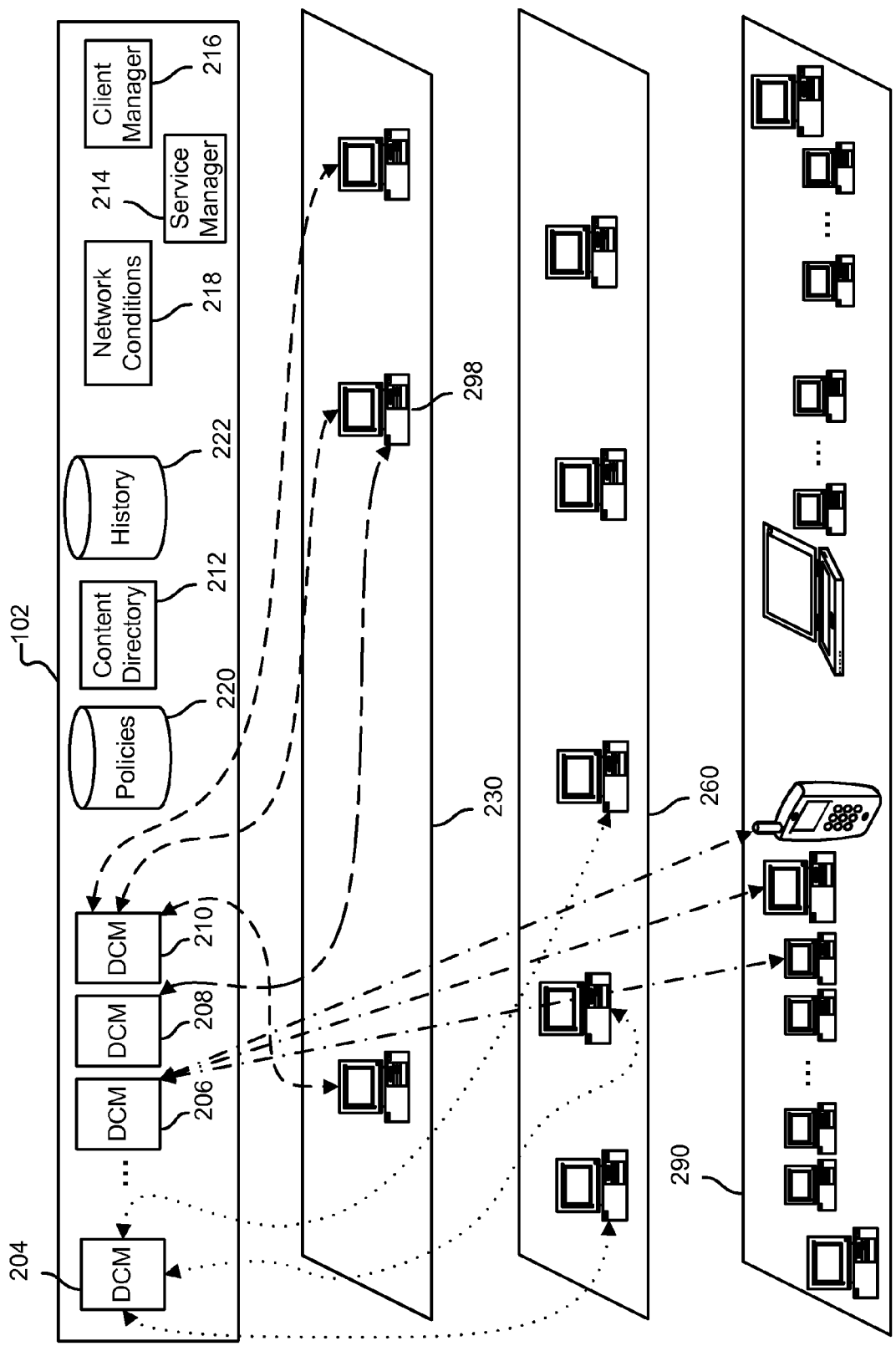
FIG. 2 is an illustration of an embodiment of a system for distributing information over a network.

FIG. 2 is an illustration of an embodiment of a system for distributing information over a network. In the example shown, control center 102 includes a plurality of delivery coordinator managers (DCMs) 204-210, a content directory 212, a client manager 216, a service manager 214, a dynamic network condition monitor 218, a policy database 220, and a history database 222. Other mechanisms may also be used to store the information in addition to or instead of databases 220 and 222, such as an indexed file system (e.g., Btrieve). Whenever control center 102 performs a task (such as communicating with a client or recording information in a database), either a single component or a subset of components or all components of control center 102 may cooperate to perform the task. For example, client manager 216 is a component configured in FIG. 2 to communicate with clients such as client 170 in order to implement control center 102 communicating with client 170. Similarly, in some embodiments portions of control center 102 are provided by one or more third parties.

Client manager 216 receives heartbeats from nodes that include state information and in turn distributes information to other components. For example, in some embodiments heartbeat messages sent by a particular node include the sequence numbers of the last packets received by the node from each of its parents, as well as the sequence numbers of the last packets sent by the node to each of its children. Among other things, this information allows the control center to determine which links are congested by comparing the sequence numbers of the packets sent/received by every node at the end of every heartbeat interval, and is provided as a feed in some embodiments into dynamic network condition monitor 218. In some embodiments, dynamic network condition monitor stores network conditions as a graph, with servers as nodes and attributes such as network load stored as weights/edges.

History database 222 tracks the performance of particular nodes in the past. Information such as loss rate histograms of getting information from other nodes is stored in the database and is used by control center 102 when assigning and reassigning peers, as described in more detail below. History database 222 may also include information such as a list of the last 10 downloads performed by the client, and the database may also be queried using techniques such as pattern matching to evaluate/approximate the historic experience of clients similar to a particular client.

When a client requests content (such as might be triggered by a user clicking on a "watch today's soccer match live" link in a browser), the client contacts control center 102 to determine if a DCM is managing that content in a region, consulting content directory 212. A region includes a set of nodes that are grouped by a variety of criteria including but not limited to network topology, geographic proximity, administrative domain (e.g., autonomous system, enterprise), and network technology (e.g., DSL, cable modems, fiber optic). If no DCM is currently responsible for the content, service manager 214 configures a DCM as appropriate. Once a DCM for the content and region that the client is in exists, the client is provided with instructions for downloading the content, e.g., from specific peers, as described in more detail below.

A client can download more than one content (also referred to herein as a "channel") at the same time. If a client interacts with multiple DCMs, these DCMs coordinate among themselves the use of the client resources, e.g., uplink and downlink bandwidth, and storage. For example, as shown in FIG. 2, node 298 is in communication with both DCM 208 and DCM 210. DCM 208 and DCM 210 coordinate with one another in managing node 298's resources.

One goal of grouping nodes into regions is to optimize traffic within a region—such as by being in close proximity (and likely sharing a fast link), and/or by having similar characteristics (e.g. a group of DSL subscribers vs. a group of cable modem subscribers). In some embodiments control center 102 implements a multi-scale decomposition (MSD) algorithm which partitions the computation of a large distribution topology into multiple computation tasks that manage a smaller number of peers (e.g., thousands to tens of thousands). In the example shown, MSD is used to organize all the nodes that subscribe to a channel (data stream) into a three-level hierarchy.

In the example shown, nodes included in the top level of a three-level hierarchy of nodes (230), include a few high capacity and stable nodes from each region which has peers subscribing to the channel. In this example, high capacity nodes include nodes whose output capacity is larger than the rate of the data being distributed. In some embodiments, if a region has no high capacity nodes, nodes may be provided (e.g., by the entity that owns control center 102) on behalf of that region located in a data center close to that region. Such a node is referred to herein as a waypoint server. In the example shown in FIG. 1, waypoint server 146 has been provided by the owner of control center 102. The waypoint server can also be provided by a third-party. Nodes may also be provided by instructing high quality clients to obtain content that they would not otherwise request.

The second level (260) includes clusters connected to the top level. A cluster includes the high capacity nodes belonging to a single region. While the goal of the second level as with the first level is robustness, the degree of redundancy used at the second level (e.g., to ensure data delivery) is typically lower than at the top level.

The bottom level (290) includes mainly low-capacity nodes (in this example, nodes whose output capacities are lower than the data rate). Each cluster of nodes in level 290 shares at least a few high capacity nodes with the second level, ensuring that each cluster has several high-quality data stream feeds.

Nodes occupying one level of the hierarchy may communicate using distribution algorithms different from nodes occupying another level of the hierarchy. For example, nodes in the top two levels (230 and 260) use distribution protocols that are optimized primarily for resilience, while the bottom level (290) uses distribution protocols that optimize for efficiency. Robustness and efficient bandwidth utilization can be optimized for as applicable.

Different groups of nodes may also communicate between levels (and at the lower levels amongst themselves) using protocols optimized for factors such as network conditions, resource usage, etc. For example, one top level node may communicate with a group of bottom level nodes using a protocol optimized for delivering information to clients that make use of dialup connections (where the bottom level nodes connect to the Internet using modems), while a group of bottom level nodes may communicate amongst themselves using a protocol optimized for communication among cable modem subscribers of a particular telecommunication company (where the bottom level nodes are all subscribers of that particular cable modem service).

In the example shown, all nodes in the top level (230) are managed by a single DCM such as DCM 210 (and as represented in FIG. 2 by dashed lines). One role of the DCM is to maintain an accurate distribution topology of the nodes at this level. The DCM computes the distribution topology based on the client available resources, the connectivity to the Internet (e.g., what kind of NAT/firewall the client is behind), congestion in the network, and various network-wide policies. In various embodiments, DCM 210 is logically a single DCM but is implemented across a plurality of physical DCMs.

In the example shown, each cluster of nodes in the third level (290) is managed by a DCM, such as DCM 206 (and as represented in FIG. 2 by dotted dashed lines). As described in more detail below, the clusters change dynamically as nodes join and leave the distribution graph. Small clusters are dynamically merged, and large clusters are split. Since this level includes the vast majority of nodes in the data group, the distribution algorithm can be optimized for efficient resource utilization. Each cluster of nodes in the second level (260) is managed by a DCM, such as DCM 204 (and as represented in FIG. 2 by dotted lines).

Policies

As described in more detail below, policies, such as are maintained in policy database 220 are considered when control center 102 constructs assignments of nodes as parents/children with respect to content. Examples of policy types include network policies, provider policies, and client policies.

A network policy specifies rules such as throughput limits on specific links, aggregate traffic in a given time (e.g., a month), and preferences for using peering links vs. internal links.

A provider policy (also referred to herein as a "content policy") specifies rules such as that when congestion is encountered, season pass holders should be given better quality (preferential) feeds than free viewers, that audio content delivery should be prioritized over video content delivery, that the delivery of advertising-supported content should be given higher priority than free content, etc. Access controls, such as that clients located in particular jurisdictions may not access particular content may also be enforced.

A client policy is set by the client, or by an administrator of the client (such as a company's IT department) that lets the client (or someone with authority over the client) specify limitations such as that the client should not act as a peer during certain hours, that a cellular phone may be a peer of a person's desktop computer but nothing else, and that entertainment content (e.g., sports and movies) are not permitted to be accessed, but other feeds (e.g., news, and streamed lectures) may be.

In some embodiments, clients may specify and/or belong to affinity groups. An affinity group is a group of peers which preferentially share information with one another. For example, when first configuring a client for use with the system shown in FIG. 1, a user may be presented with a menu that allows the user to designate "friends" or other members of an affinity group. In some embodiments existing relationships are leveraged, such as lists of friends from social networking sites, instant messaging friends, or email address-books. In other cases, users are prompted to enter usernames or other identifying information of friends (e.g., IP addresses or ranges of addresses) who have established accounts with control center 102 or other entities such as content distributor 142. Affinity groups may also be established based on knowledge of a password, or other authenticating information. Members of an affinity may establish policies favoring the use of their uplink capacity to distribute content to other members of the group. They may also specify policies such as allowing other members of the affinity group to make use of their uplink capacity at all times while restricting stranger's use of their uplink capacity entirely, or during specified times or circumstances.

As described in more detail below, when a distribution structure is generated, certain constraints inside the network may be explicitly considered. In some cases, some policies (such as traffic localization or path selection to a corporation) can be implemented at the corporate network.

Policies can be configured to apply to a variety of objects. For example, users, servers, clients, internet routable resources, video objects, and customers can all be involved in a policy. Each object may also have a variety of attributes that can be used in forming a policy. For example, a policy may be written that only applies to users behind a NAT, clients connected to ISPs via DSL, employees of XYZ Corporation, and users that log into a particular website a certain number of times per month. Policies can also apply to arbitrary groups/associations of entities, such as applying to a whitelist or blacklist of IP addresses or IP address ranges.

Examples of policies include:

Specifying that it is preferable for traffic to make use of peering links whenever possible.

Specifying that the amount of traffic used by a content provider's servers should be minimized and that usage of clients' uplink capacity should be maximized. (E.g. to minimize the content provider's hosting costs.)

Specifying that nodes should use the uplink capacity of a content provider's servers over the uplink of peers, e.g., for quality reasons.

Specifying that SP2 does not want the bandwidth over a specific link used by a sporting event to exceed 20 Mbps.

Specifying that SP3 does not want aggregate video traffic (including both live events like the sporting event and files such as the movie) to exceed a certain amount.

Specifying that due to a bottleneck within P1's network, limits on video traffic along an internal link should be imposed.

Specifying that particular content (e.g., a specific movie) should not be distributed to clients located in Germany.

Specifying that a live sporting event should be streamed immediately to paying customers, but that non-paying customers should receive a time-delayed version of the content.

Specifying that when multiple client machines determined to be behind a common corporate firewall or NAT are tuning to the same broadcast channel, only one stream of video is transmitted into the firewall before the video is further disseminated to other machines within the corporate network.

Specifying that if a corporation's network is multi-homed (connected by two different ISPs), when a large number of clients from the corporation tune to an important broadcast, it is desirable that there will be minimal service disruption even under heavy client churning. (For example, by improving the resiliency of the broadcast by specifying that two complete video streams be transmitted to the corporate network, each via a different ISP.)

Specifying that a video should be transmitted via SP1 during normal network operation and only be transmitted via SP2 if the link to SP1 is congested.

Specifying that aggregate outgoing audio traffic from SP1 to SP2 should be less than 1 Gbps.

Specifying that aggregate traffic from SP1 to SP2 should not exceed a certain limit.

Specifying that so long as the month-to-date aggregate of traffic across a link does not exceed a certain threshold, clients requesting content should preferably be assigned a data center as a source of the content; if the threshold is exceeded, the source should preferentially become other clients.

In some cases, modifiers such as peak and long term average are used in constructing policies. Additional examples of policies include providing differentiated services for premium customers, defaulting to different download/upload speeds during busy/idle cycles, providing differentiated upload speeds for different peers, and giving priority to premium users (such as those that buy more movies, follow link ads more often, etc.) over standard users.

In some embodiments, policies are implemented by a process, called the policy manager, provided by control center 102. The policy manager is responsible for maintaining the relevant information to enforce the policy, such as by keeping policy database 220 current, and providing dynamic network condition monitor 218 with information.

In the example shown in FIG. 2, each DCM has access to all of the policies stored in policy database 220. In some cases, the DCMs all communicate with a single policy database 220. In other cases, policy database 220 and/or portions of policy database 220 are replicated or mirrored across multiple platforms. The set of policies typically changes relatively slowly over time, and in some embodiments a simple gossiping protocol is used to maintain the consistency of the set policies at all servers.

Dynamic network condition monitor 218 can be configured to receive information from a variety of sources. For example, tools such as BGP peering and traceroute can be used to provide/coordinate information. In some cases, ISPs provide insight into their networks (e.g., to help prevent internal bottlenecks). Client software and/or software running on network devices such as switches can also be used to augment the information. For example, a client behind a NAT or firewall may be able to provide additional insight not visible with a tool such as traceroute.

In some cases, portions of dynamic network condition monitor 218 (e.g., database storage and retrieval) are provided by and/or replicated across various other modules or infrastructure depending, for example, on factors such as scalability and availability (reducing the likelihood of having a single point of failure), and the techniques described herein may be adapted accordingly.

When network traffic travels from a source to a destination, it typically passes through several different logical and physical network components. In the Internet, an autonomous system (AS) is a collection of IP networks and routers under the control of one administrative entity (or sometimes more) that presents a common routing policy to the Internet. At a high level, the traffic passes from one AS to another. E.g., a movie file (and/or portions thereof) fetched by client 170 from content distributor 142 might traverse from the Backbone ISP through SP1 (each identified by an AS number) to reach client 170. That same traffic is logically routed through a plurality of layer 3 routing devices, and linked at the data layer through a plurality of switches (layer 1/layer 2). Examples of network components include each entity (e.g., the AS, the layer 3 router, and the layer 1/layer 2 switch) through which the data passes (or by which the data is routed). Other examples of network components include links, inter-AS links, geography (such as country, state, and city), and hosts (servers and/or clients).

In some embodiments off-net traffic for an access ISP is included in the information collected by dynamic network condition monitor 218. Access ISPs connect directly to subscribers. The off-net traffic traverses the links that connect the access ISP to other ISPs. One way of collecting information about off-net traffic is through the use of software running on the sending and/or receiving nodes. For example, based on the source and destination IP addresses of a packet, the source and destination ISPs can be inferred. If the source and destination ISPs are the same, the packet stays at the same ISP. Otherwise, the packet traverses between two different ISPs.

Additional information, such as the owner of the content being transferred, the number of bytes transferred, the time of the start of the transfer, the time of the end of the transfer, the maximum data transmission rate of the event, the average rate of the transmission, and the title of the content, can be collected by client manager 216 and associated with information collected by dynamic network condition monitor 218. The level of detail of information can vary. For example, in some cases the information may include noting that an event has occurred but little else. In other cases, such as when the content distributor has or provides access to a backend database of meta-information associated with the content, more detailed information (e.g., artist name) may be included.

Figure 3:
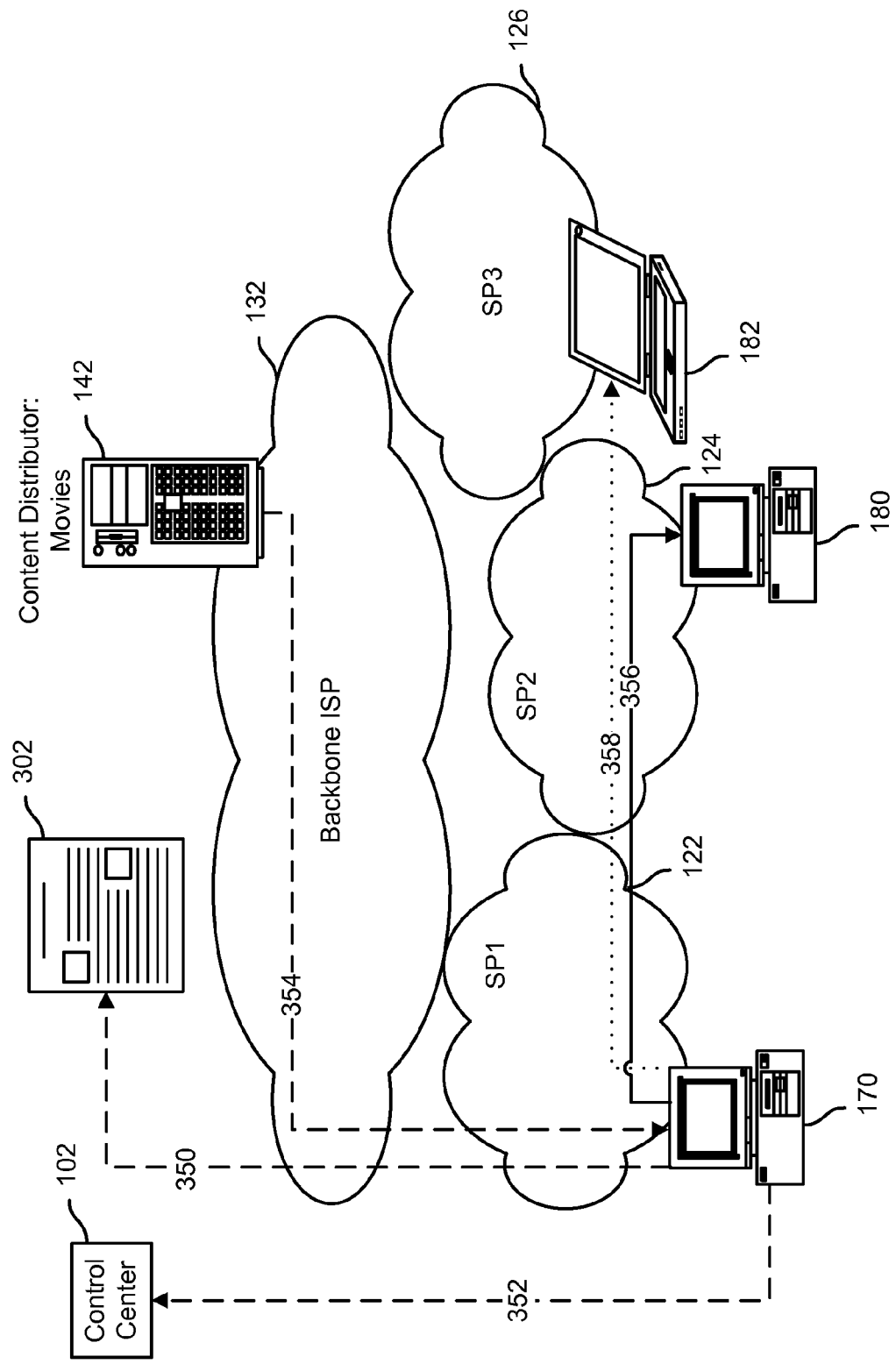
FIG. 3 illustrates an example of a network through which content is distributed.

FIG. 3 illustrates an example of a network through which content is distributed. In the example shown, a subscriber (via client 170) desires to download the movie, Robin Hood. The client contacts (350) the movie studio's web page (302) and initiates a file transfer using an agent resident on client 170 which is in communication with control center 102 (352). As described in more detail below, control center 102 facilitates the directing of clients to one or more appropriate sources of content or portions of the content. For example, client 170 may be directed to fetch the entire movie from content distributor 142 (354).

While client 170 is downloading the film from content distributor 142 (354), clients 180 and 182 similarly visit page 302 to request the content. In this example, they are directed by control center 102 to fetch portions of the content from client 170, rather than downloading the entire content from content distributor 142. Client 102 accordingly sends portions of the content to client 180 (356) and client 182 (358).

Figure 4:
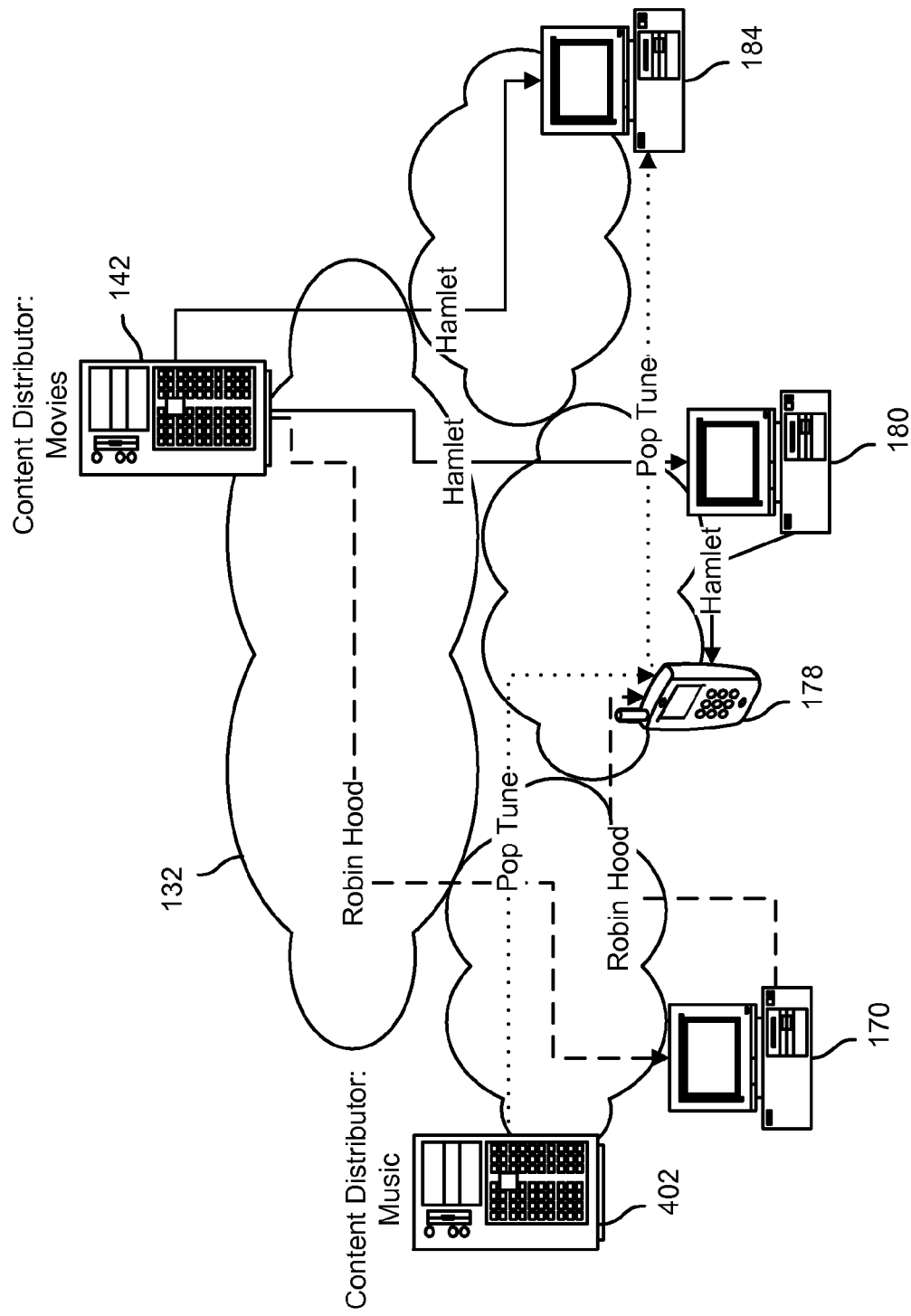
FIG. 4 illustrates an example of a network through which content is distributed.

FIG. 4 illustrates an example of a network through which content is distributed. The example shown represents a scenario in which content distributor 142 is seeding multiple pieces of content to clients and where content distributor 402 is also seeding content to clients. Control center 102, using the techniques described herein, assigns nodes parents and children, creating a distribution topology that efficiently distributes multiple files to multiple clients. In the example shown, client 170 is downloading the movie Robin Hood from content distributor 142 and is uploading portions of that movie to client 178. Clients 180 and 184 are both downloading copies of Hamlet from content distributor 142. Client 180 is uploading portions of Hamlet to client 178. Meanwhile, content distributor 402 is seeding a song to client 178, which is in turn seeding the song to client 184. It is likely that the song ("Pop Tune") being transmitted requires significantly less bandwidth than either of the movie files.

Peer Assignment

Figure 5:
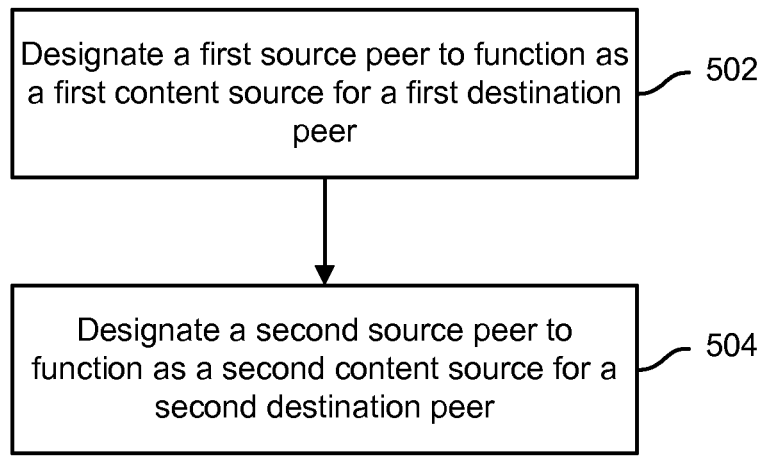
FIG. 5 illustrates and example of a process for coordinating the assignment of peers.

FIG. 5 illustrates and example of a process for coordinating the assignment of peers. In some embodiments the process shown in FIG. 5 is implemented by control center 102.

Suppose a client, such as client 180 (as shown in FIG. 3), has indicated that it would like to access content, such by selecting a "download Robin Hood" link from a web interface. In some embodiments an agent installed on client 180 communicates with control center 102 to receive instructions on how to retrieve the movie, whether as a file, or as a streaming event.

As described in more detail below, control center 102 considers a variety of factors, such as the network traffic implications of the peers it associates, resource availability, which files are being distributed, the number of clients currently uploading or downloading content, the nature of the client, historical information from history database 222, etc. Control center 102 can coordinate multiple file transfers to different nodes (e.g., where one user wants the movie and another user wants the sporting feed). In various embodiments, assignment of peers may occur sequentially (e.g., all applicable peers are assigned to client A and then to client B) or may be interleaved (e.g., client A is assigned a peer, client B is assigned a peer in light of client A, and client A is assigned an additional (or new) peer).

Even in the case of single file coordination, the techniques described herein can improve efficiency and provide a better cumulative effect (e.g., across multiple clients and on the network). For example, suppose that 1000 subscribers in SP2 all want to watch a copy of the same content. Control center 102 can organize a distribution topology such that a handful of copies enter (are downloaded by) SP2 subscribers from SP1 or SP3, a handful of copies leave (are uploaded by) SP2 subscribers to SP1 or SP3, and the majority of the content distribution is performed intra-SP2.

The process begins at 502 when a first source peer is designated to function as a first content source for a first destination peer. For example, at 502, client 170 might be designated to serve as a source of Robin Hood for client 180. One way of determining which node(s) should be designated as content sources for which destination peers is as follows:

First, control center 102 evaluates the existing distribution topology (e.g., the comprehensive list of which nodes are uploading/downloading which files) and creates a list of feasible parents. A feasible parent is a parent that can serve at least a portion of the content, without considering any additional constraints. For example, a feasible parent is one that is in possession of at least a portion of the desired content.

Next, the list of feasible parents is evaluated against policies (e.g., in policy database 222). Nodes which would violate policies if assigned as parents are removed from the list. For example, an otherwise desirable parent (e.g. one on a fast link with a complete copy of the content) may be removed if its link is already congested, if it is served by SP1 instead of SP2, if it has a client policy that dictates not sharing with the prospective child/destination, etc. Affinity group membership is also considered. Information such as is found in history database 222 may also be evaluated when removing feasible parents, or feasible parents may be ranked based on information in history database 222.

After the feasible parent list has been pruned, the remaining prospective parents can be optimized as appropriate, such as by associating the clients that are nearest one another. In some cases, parents may be assigned from the remaining prospective parents at random.

In some cases, it may not be possible to assign any parents without violating a policy. For example, if a destination node is located in a country into which the desired content is not permitted to be transferred, all prospective parents will be removed from the list of feasible parents. Similarly, if an age-based constraint is applied to the content, the destination node may likewise be unable to be assigned parents. An appropriate error describing the reason that the content cannot be provided may be given, as applicable.

In some cases, policies are ranked or otherwise tagged with conditions that specify how strictly they are to be applied. Policies may also be ranked—providing an indication of which order policies should be applied in, in case the policies conflict. For example, a content provider may specify that paying customers receive priority over non-paying customers (among other constraints, such as bandwidth limits). However, if such a node is unable to receive the content at all (its list of feasible parents is reduced to 0 by the application of policies), the content provider may specify that the bandwidth limit constraint be ignored with respect to the client, so that the client is able to receive the content, albeit at significantly reduced quality.

At 504, a second source peer is designated to function as a second content source for a second destination peer. The process described in conjunction with portion 502 of the Figure shown in FIG. 5 is, in some embodiments repeated at 504. A list of feasible parents to serve as content sources for the second destination peer is constructed and evaluated for policy violations and an optimal (or random) parent is selected from the pruned list of feasible parents.

The example shown in FIG. 5 is a process for selecting parents and assigning them to requesting children. The techniques described herein can also be adapted to select children and assign (and reassign) them to requesting parents, as applicable.

In some embodiments, the processing performed at 504 is dependent on the processing performed at 502. For example, if a client has a maximum uplink capacity of 300 kbps, if 150 kbps is allocated at 502, only the remaining 150 kbps will be considered available when evaluating the client's potential as a feasible parent for another node at 504. Similarly, suppose at 502 client A is instructed to fetch Robin Hood from a set of parents. If client B is on the same enterprise network as client A, and also wishes to fetch Robin Hood, at 504 client B may be instructed to fetch Robin Hood from client A, rather than the set of parents it would otherwise have been assigned if client A hadn't already requested Robin Hood. In some embodiments the processing performed at 502 and 504 is performed sequentially. In other embodiments, the processing performed at 502 and 504 occurs simultaneously or substantially simultaneously. For example, in addition to the determination made at 504 being based at least in part on the determination made at 502, the determination at 502 can likewise be based at least in part on the determination made at 504.

As another example, suppose DCM 206 wishes to connect two nodes (nodes n1 and n2) in its cluster. The DCM can use the BGP feeds to determine whether the path from n1 to n2 passes through the peering link S1→S2. If so, the DCM sends a reservation request to a policy manager. The reservation request includes the estimated bandwidth between n1 and n2. Upon receiving the request, the policy manager determines whether the requested bandwidth can be allocated. If so, the policy manager grants the request and nodes n1 and n2 are provided with instructions to connect. A soft state can be used to maintain the available bandwidth at the policy manager. Once a DCM receives a granted request, the DCM is configured to continually refresh it. If the connection between n1 and n2 is tiered down, the DCM stops sending refresh messages to the policy manager, which in turn causes the reservation to timeout.

In some embodiments measurement admission control is used to improve statistical multiplexing among the DCMs sharing a peering link. In this case, a DCM includes in the refresh messages it sends to the policy manager the actual bandwidth used by its connections rather than the bandwidth it has reserved.

The bandwidth managed by the policy manager can be partitioned across multiple DCMs to avoid a DCM from contacting the policy manager every time it creates a new connection. In this case, the bandwidth reservation request of a DCM is processed locally; if there is enough available bandwidth allocated to that DCM, the request is granted immediately without contacting the policy manager. The bandwidth partition is periodically updated based on the actual bandwidth used by every DCM. If this period is much higher than the number of reservation requests, the control overhead of the bandwidth allocation can be significantly reduced.

EXAMPLE

Assignment Based on Peer Type

In some embodiments, the clients included in the environment shown in FIG. 1 are classified into two types—"regular" clients and "lightweight" clients. A regular client is a client that is able to both initiate connections and to accept incoming connection requests. A regular client is also able to serve content to other nodes. A lightweight client is a client that has reduced functionality compared to the "regular" client.

As one example, a lightweight client could be able to initiate connections but not be able to accept incoming connection requests. One reason that a client might be unable to accept incoming connection requests is that firewall prevents it from doing so.

Another reason is that the client could be participating in the environment shown in FIG. 1 through a "no-install" dynamically loaded player that is executed in a browser application (e.g., via ActionScript, C#, or JavaScript). The term "no-install" in this instance means that a user of the client was not prompted to approve an install of a software application (or saving of a plugin or applet) in order to participate in the receiving of content from other nodes in the environment shown in FIG. 1. For security reasons, no-install implementations may prevent the client from accepting incoming connections.

Another reason that a client may be designated as "lightweight" is because it is limited in the sources it can receive content from, irrespective of who initiates the connection. For example, for security reasons, a client may be limited to receiving content from a node that is enumerated on an access list. Nodes such as CDNs could be included in the access list, while personal computer peers would likely not be included in the access list.

Yet another reason that a client may be designated as "lightweight" is if it is unable to forward the content that it receives to downstream clients. As one example, a no-install client may not have access to content that is cached on disk, but instead only the content that is cached in memory. The networking functionality of the language in which the no-install client is implemented may require content to be transmitted to be accessible via disk.

Control center 102 can determine the type of client based on implementation information (e.g., that a particular client is using a particular Flash implementation vs. a Java implementation). Control center 102 can also be configured to test the functionality of clients and classify their types based on the results of the testing in addition to or instead of relying on reported version/implementation information.

In various embodiments, control center 102 is configured to consider the type of client (regular vs. lightweight) when assigning peers. For example, at 502 in the process shown in FIG. 5, control center 102 can be configured to: (a) assign a regular client as a content source for a lightweight client; (b) assign a regular client as a content source for a regular client; and/or (c) assign a CDN as a content source for a lightweight client. Control center 102 is configured to not assign two lightweight clients to one another.

When control center 102 makes an assignment, in various embodiments, the nodes assigned to one another mutually initiate connection attempts. For example, suppose control center 102 assigns client 170 as a source of content for client 182. Clients 170 and 182 can both be configured to attempt connection attempts to one another, thus increasing the chances that a single successful connection will be made between the two nodes. If a client is determined to be a lightweight client, in some embodiments, the node(s) with which is paired by control center 102 are configured to not attempt to make connection attempts with the client. Instead, only the lightweight client is configured to initiate a connection. In various embodiments, control center 102 is configured to track whether two clients assigned to one another by control center 102 are unable to establish a connection (i.e., neither is able to connect to the other). Unsuccessful pairings can be blacklisted from being tried in the future as applicable.

As another example of how the client type (regular vs. lightweight) can be considered by control center 102 when making an assignment decision, regular clients can be assigned higher quality sources (e.g., having faster connections or better uptimes) while lightweight clients can be assigned lower quality sources. Regular clients can also be assigned better quality versions of the content (e.g., high definition or commercial-free) than lightweight clients. If a user has the ability to choose between using a regular client and a lightweight client, the difference in quality that will be experienced by the user can be used to encourage the user to select the regular client (and thus contribute to the environment shown in FIG. 1 its services as a source).

Peer Reassignment

Typical P2P distribution schemes work by having a tracker provide a list c of peers to a client. If/when the specified peers "die" or otherwise cease providing access to content, the client may request a new batch of peers.

Using the techniques described herein, control center 102 can be configured to continually assess and reassign, on an ongoing basis, the peers with which a client is exchanging content. New peer lists may be provided to a client on a periodic basis. In some embodiments the reassessment/reassignment process occurs with a very high frequency, such as on second-level intervals. Such reassignment may be used, for example, in the case of a live sporting event where high availability of a connection may be paramount. One example way to perform fast reassignment is as follows. Clients are organized based on their available uplink capacities using a priority queue. When a client loses one or more of its neighbors or the aggregate rate it receives from its neighbors is less than the stream rate, the reassignment algorithm will select new neighbors for the client by choosing the clients with the highest available bandwidth from the priority queue. To balance between the neighbor (parent) uplink capacity and geographic proximity, the reassignment algorithm first selects a larger set of potential parents and then selects the parents which are the closest to the client from this set. A potential parent is a node whose available bandwidth is larger than the additional required bandwidth of the child node. In this scenario, "parent" denotes any node that sends data to another node and is applicable irrespective of whether tree-based protocols (in which a parent is defined with respect to an entire (sub)stream) or swarming protocols (in which a parent is defined with respect to a small granularity data unit such as a data packet or block) are used.

In some embodiments each client in a cluster sends periodic information to its cluster's DCM. This information can include (but is not limited to) CPU load, available storage, geographic location, the list of children and parents in the distribution topology, congestion information for each data stream received/sent from/to other clients, and an IP-level path to other clients. In addition to this information, the DCM has access to BGP feeds and the mappings between IP addresses and their geographic locations. The DCM uses this information to maintain a global and up-to-date view of the entire cluster. This view includes the locations of the clients, whether a client is behind NAT/firewall (and if yes, the type of NAT/firewall), client resource availability, and the level of network congestion along the paths between various clients.

The DCM uses this cluster-global view in some embodiments to periodically recompute the distribution topology in the cluster. If the topology changes after the recomputation, the DCM sends instructions to the appropriate clients to update the distribution topology. In turn, upon receiving such instructions a client changes its set of parents and clients to realize the new topology.

Figure 6:
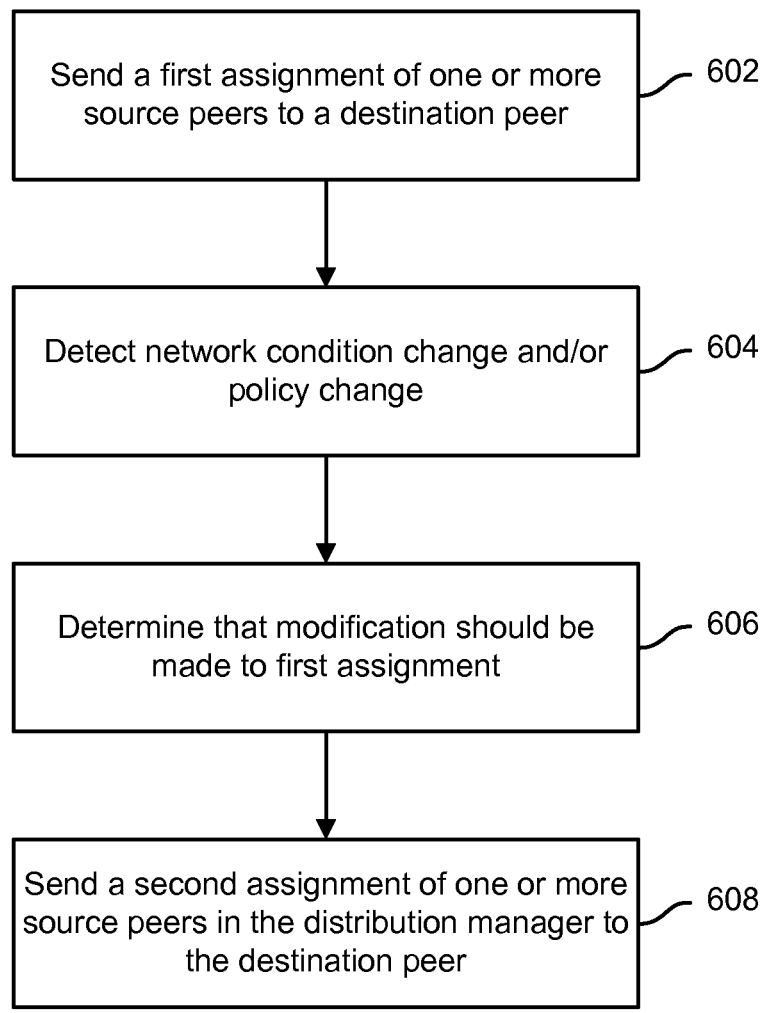
FIG. 6 illustrates an example of a process for coordinating the assignment of peers.

FIG. 6 illustrates an example of a process for coordinating the assignment of peers. In some embodiments the process shown in FIG. 6 is implemented by control center 102. The process begins at 602 when an assignment of one or more parents is sent to a destination node. In some embodiments, the set of parents is assigned to a node using the techniques described in conjunction with FIG. 5. In other embodiments other techniques are used to provide a destination node with an initial set of parents at 602, such as by assigning parents at random, assigning a server (and specifically ignoring feasible peers, etc.). In various embodiments, an assignment of one or more children is sent to a source node at 602 and the techniques described herein are adapted accordingly so that child selection is performed, rather than or in addition to parent selection.

At 604, a change in a network condition and/or a policy change is detected. For example, at 604 it may be determined by dynamic network condition monitor 218 that a recent network failure has created a bottleneck along a link, or that high demand for a popular live sporting event has saturated a link. Similarly, at 604 it may be determined (e.g., by a policy manager) that a new policy has been loaded into policy database 220 or that an event, such as the end or start of a workday has occurred. In some cases, the detected changes may be negligible, or may affect only a very small portion of the nodes managed by control center 102. In other cases the detected changes may be significant enough to warrant the recalculation of all or a portion of the distribution topology. Different thresholds can be used, as applicable, for determining when and whether the distribution topology or a portion thereof should be recalculated. For example, if several high capacity nodes join or leave the system shown in FIG. 1, the entire distribution topology may need to be refreshed. As smaller nodes (e.g., cellular phones and personal computers on slow links) join and leave the distribution graph, small clusters can be dynamically merged and large clusters can be dynamically split with minimal impact on the distribution topology as a whole. In some embodiments, recomputations are performed on recurring basis, such as once every five minutes.

One example of an efficient distribution topology is a multi-tree. In the multi-tree case, the stream is divided into several streams. For each stream, a DCM computes an overlay multicast tree including all clients in the cluster subject to the capacity constraints of the clients, and performance and policy constraints. One way of building a multi-tree topology is by building trees one at a time. A greedy algorithm can be used that adds nodes to a sub-tree one by one, making sure that none of the additions violates the existing constraints (and, for example, starting with higher priority nodes, such as premium customers vs. nonpaying clients). Heuristics can be used to increase the probability that the greedy algorithm succeeds. An example of such heuristic is to select the node with the highest capacity, or fewest constraints.

If, as a result of the recomputation, it is determined that the parents (or children, in the case of a "child selection" implementation) of a destination (source) should be changed (606), at 608 the revised assignment is propagated to the destination (source) peer. In some embodiments the revised assignment is transmitted by control center 102 using client manager 216, which is in regular communication with the client. As used herein, a "revised" assignment may include entirely new instructions—including directing the client to obtain content from source peers with which it has not previously communicated. In some embodiments, the revised assignment may be null. Such may be the case, for example, if a new node, with higher priority joins the system and resources are sufficiently constrained that a node with lower priority must be displaced.

Examples of scenarios in which recomputation of the distribution topology and/or portions thereof could be performed include a significant failure in the network, increasing congestion in the network, the leaving and/or joining of a high quality node (e.g., a node in region 230 of FIG. 2), and the rapid requests by many clients for the same content (e.g., the beginning of an international sporting event).

One example of a technique for accommodating a failure in the network is as follows. Each client reports in each heartbeat how much data it has received from each of its parents. If the client has not received any data from a parent over a predefined number of consecutive heartbeat intervals, the DCM will conclude that either the parent (i.e., the sender node) has failed or a network component on the communication path from the parent to the client has failed. In either case, the DCM will reassign a new parent to the client. For example, a parent with the available uplink capacity larger than the additional bandwidth required by the child node will be selected.

Network congestion is addressed in some embodiments by using the following technique. Using the information in the heartbeat messages, the DCM can compute the rate at which each client receives data from each of its parents in every heartbeat interval. If the computed rate is lower than the expected (sub)stream rate over a certain number of heartbeat intervals, the DCM concludes that the path between the parent and the child is congested and initiates a parent reassignment.

An example of a technique for addressing the addition of a high quality node to the system is as follows. When a high quality node (e.g., a node that has high uplink capacity and has had high availability in the past) joins the network, the DCM can reassign some of the existing clients to the high-quality node. In some embodiments the DCM optimizes the distribution topology by placing these high quality nodes close to the source. For example, if a low quality node A is connected to the source, the DCM could preempt A, and replace it with a high quality client B that has just joined. Further, the DCM will assign B as a parent to client A.

One way of adapting to the departure of a high quality node from the system is as follows. When a high quality node leaves the system, the DCM will select new parents for the children of that node among other high quality nodes, if available. In some embodiments, if the system becomes infeasible after a high quality node leaves, the DCM ejects nodes with low uplink capacity until the system becomes feasible again. A system is infeasible when the aggregate uplink capacity of all nodes plus the source does not exceed the aggregate rate required by all nodes to receive the stream, i.e., the stream rate multiplied by the number of clients. By removing the clients with uplink capacities lower than the stream rate, in the increasing order of the clients' uplink capacities, the system is guaranteed to become feasible.

In the scenario in which millions of clients request the same content effectively simultaneously, the following technique can be used. At the lowest level (e.g., portion 290 shown in FIG. 2), DCMs are dynamically split when the number of clients in a cluster exceeds a certain threshold. Suppose at the lowest level there is one cluster per continent. When the number of clients joining the North America cluster exceeds the predefined threshold, the DCM in charge of the North America cluster is split into two DCMs, one for the United States, and one for all the other countries. If the number of clients in the United States is still larger than the predefined threshold, the United States DCM is split into three DCMs— one for the Eastern region, one for the Midwest, and one for the Western region. Another technique, instead of geographic splitting, is to split the DCMs based on the network topology. For example, the United States DCM can be split into a DCM for Carrier A clients, a DCM for Carrier B clients, and another DCM for all the other clients in the United States.

One way to split DCMs is as follows. First, the control center creates n–1 DCMs, where n is the number of clusters into which the original cluster should be split; the original DCM will own one of these new clusters. Next, the original DCM will reassign the clients that no longer belong to its cluster to the other DCMs. For example, the clients can be informed in heartbeat message responses which DCMs to join.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for facilitating the distribution of content, comprising:
   a computer processor configured to:
      receive a request for content from a requesting peer; and
      apply a peer type compatibility criteria to an allocation process that allocates at least one sending peer from a plurality of candidate sending peers to deliver the content to the requesting peer;
      wherein applying the peer type compatibility criteria includes determining the type of the requesting peer and at least a portion of the plurality of candidate sending peers to ensure that a lightweight peer is paired with a regular peer;
      wherein a regular peer is a peer that is able to accept incoming connection requests and initiate connections; and
      wherein a lightweight peer is a peer that has less functionality than the regular peer; and
   a memory coupled to the processor and configured to provide the processor with instructions.

2. The system of claim 1 wherein the lightweight peer is able to initiate connections but is unable to accept incoming connection requests.

3. The system of claim 1 wherein the lightweight peer is limited in the sources from which it can receive content.

4. The system of claim 3 wherein the lightweight peer is limited based at least in part on an access list.

5. The system of claim 1 wherein the lightweight peer is unable to redirect content.

6. The system of claim 1 wherein the regular peer comprises a content delivery network node.

7. The system of claim 1 wherein the lightweight peer is a no-install client.

8. The system of claim 1 wherein the sending peer is configured to send a connection request to the receiving peer.

9. The system of claim 1 wherein the receiving peer is configured to send a connection request to the sending peer.

10. The system of claim 1 wherein the sending peer is configured to send a connection request to the receiving peer and wherein the receiving peer is configured to send a connection request to the sending peer.

11. The system of claim 1 wherein the allocation process includes allocating a plurality of sending peers that cooperate to deliver the content to the requesting peer.

12. The system of claim 1 wherein the sending peer is a lightweight client and wherein the sending peer is configured to send a connection request to the receiving peer.

13. The system of claim 1 wherein the receiving peer is a lightweight client and wherein the receiving peer is configured to send a connection request to the sending peer.

14. The system of claim 1 wherein the processor is further configured to determine whether a connection attempt involving the requesting peer and the sending peer is successful.

15. A method for facilitating the distribution of content, comprising:
   receiving a request for content from a requesting peer;
   applying, using a computer processor, a peer type compatibility criteria to an allocation process that allocates at least one sending peer from a plurality of candidate sending peers to deliver the content to the requesting peer;

wherein applying the peer type compatibility criteria includes determining the type of the requesting peer and at least a portion of the plurality of candidate sending peers to ensure that a lightweight peer is paired with a regular peer;

wherein a regular peer is a peer that is able to accept connections and initiate connections; and wherein a lightweight peer is able to initiate connections but is unable to accept connections.

16. A computer program product for facilitating the distribution of content, the computer program product being embodied in a non-transitory computer readable storage medium and comprising computer instructions for:

receiving a request for content from a requesting peer;

applying a peer type compatibility criteria to an allocation process that allocates at least one sending peer from a plurality of candidate sending peers to deliver the content to the requesting peer;

wherein applying the peer type compatibility criteria includes determining the type of the requesting peer and at least a portion of the plurality of candidate sending peers to ensure that a lightweight peer is paired with a regular peer;

wherein a regular peer is a peer that is able to accept connections and initiate connections; and wherein a lightweight peer is able to initiate connections but is unable to accept connections.

* * * * *

UNITED STATES PATENT AND TRADEMARK OFFICE
CERTIFICATE OF CORRECTION

PATENT NO.        : 8,566,436 B1
APPLICATION NO.   : 12/730032
DATED             : October 22, 2013
INVENTOR(S)       : Stoica et al.

It is certified that error appears in the above-identified patent and that said Letters Patent is hereby corrected as shown below:

In the Claims

Column 16, Line 44:
delete "receiving" after the

Column 16, Line 44:
insert -- requesting -- after the

Column 16, Line 45:
delete "receiving" after wherein the

Column 16, Line 45:
insert -- requesting -- after wherein the

Column 16, Line 48:
delete "receiving" after the

Column 16, Line 48:
insert -- requesting -- after the

Column 16, Line 49:
delete "receiving" after the

Column 16, Line 49:
insert -- requesting -- after the

Column 16, Line 55:
delete "client" after lightweight

Signed and Sealed this
Twenty-first Day of October, 2014

Michelle K. Lee
*Deputy Director of the United States Patent and Trademark Office*

CERTIFICATE OF CORRECTION (continued)
U.S. Pat. No. 8,566,436 B1

Column 16, Line 55:
insert -- peer -- after lightweight

Column 16, Line 56:
delete "receiving" after the

Column 16, Line 56:
insert -- requesting -- after the

Column 16, Line 58:
delete "client" after lightweight

Column 16, Line 58:
insert -- peer -- after lightweight

Column 16, Line 58:
delete "receiving" after the

Column 16, Line 58:
insert -- requesting -- after the